(12) United States Patent
McJilton et al.

(10) Patent No.: US 9,891,902 B2
(45) Date of Patent: *Feb. 13, 2018

(54) PERFORMING ADMINISTRATIVE TASKS ASSOCIATED WITH A NETWORK-ATTACHED STORAGE SYSTEM AT A CLIENT

(71) Applicant: Hewlett-Packard Development Company, L.P., Houston, TX (US)

(72) Inventors: Charles Martin McJilton, Longmont, CO (US); Paul Michael Cesario, Fort Collins, CO (US); Matthew D. Haines, Fort Collins, CO (US); Eric Peterson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/146,333

(22) Filed: May 4, 2016

(65) Prior Publication Data

US 2016/0253162 A1   Sep. 1, 2016

Related U.S. Application Data

(63) Continuation of application No. 13/002,603, filed as application No. PCT/US2008/069021 on Jul. 2, 2008, now Pat. No. 9,354,853.

(51) Int. Cl.
*G06F 17/30* (2006.01)
*G06F 9/445* (2006.01)
(Continued)

(52) U.S. Cl.
CPC .............. *G06F 8/61* (2013.01); *G06F 3/0484* (2013.01); *G06F 3/067* (2013.01); *H04L 63/02* (2013.01);
(Continued)

(58) Field of Classification Search
CPC . G06F 8/61; G06F 8/65; G06F 3/0484; G06F 3/067; H04L 63/02; H04L 67/02; H04L 67/1097; H04L 67/34
(Continued)

(56) References Cited

U.S. PATENT DOCUMENTS 5,742,829 A    4/1998  Davis et al.
5,842,011 A   11/1998  Basu
(Continued)

FOREIGN PATENT DOCUMENTS

| KR | 1020050029705 | 3/2005 |
| KR | 1020060095061 | 8/2006 |
| KR | 20080007132 | 1/2008 |
| KR | 20080010329 | 1/2008 |

OTHER PUBLICATIONS

Bantz, "Autonomic personal computing", IBM Systems Journal, vol. 42, No. 1, 2003, pp. 165-176.*
(Continued)

*Primary Examiner* — Luu Pham
*Assistant Examiner* — Walter Malinowski
(74) *Attorney, Agent, or Firm* — Trop Pruner & Hu, P.C.

(57) ABSTRACT

In some examples, a client device receives, from a network-attached storage (NAS) system, installer code. Executing the installer code at the client device causes display of a user interface at the client device. Questions are presented in the user interface at the client device. Responsive to answers to the questions received in the user interface, the installer code executing at the client device installs a subset of software components relating to the NAS system the client device.

15 Claims, 4 Drawing Sheets

(51) Int. Cl.
  *G06F 3/06* (2006.01)
  *G06F 3/0484* (2013.01)
  *H04L 29/06* (2006.01)
  *H04L 29/08* (2006.01)

(52) U.S. Cl.
  CPC .......... *H04L 67/02* (2013.01); *H04L 67/1097* (2013.01); *H04L 67/34* (2013.01)

(58) Field of Classification Search
  USPC ............ 726/27; 709/220; 717/173, 174, 178
  See application file for complete search history.

(56) References Cited

U.S. PATENT DOCUMENTS

| | | | |
|---|---|---|---|
| 5,991,542 A | 11/1999 | Han et al. | |
| 6,633,535 B1 | 10/2003 | Asada | |
| 6,826,707 B1 | 11/2004 | Stevens | |
| 6,839,746 B1* | 1/2005 | Muthiyan | H04L 29/06 709/220 |
| 6,922,831 B1* | 7/2005 | Kroening | G06F 8/60 717/172 |
| 7,000,231 B1 | 2/2006 | Gold | |
| 7,055,014 B1* | 5/2006 | Pawlowski | G06F 3/0605 707/E17.01 |
| 7,275,098 B1* | 9/2007 | Becher | G06F 3/0607 709/223 |
| 7,284,044 B2* | 10/2007 | Teraoaka | G06F 11/0733 704/8 |
| 7,496,757 B2 | 2/2009 | Abbott et al. | |
| 7,523,452 B1* | 4/2009 | Kamity | G06F 8/65 717/178 |
| 7,620,948 B1* | 11/2009 | Rowe | G06F 8/65 717/171 |
| 7,720,864 B1 | 5/2010 | Muth et al. | |
| 7,783,600 B1 | 8/2010 | Spertus et al. | |
| 8,275,827 B2* | 9/2012 | Hubbard | G06F 9/5044 709/201 |
| 8,595,718 B1* | 11/2013 | Naslavsky | G06F 17/30572 707/710 |
| 2003/0014504 A1* | 1/2003 | Hess | H04L 29/06 709/220 |
| 2003/0018657 A1 | 1/2003 | Monday | |
| 2003/0046335 A1* | 3/2003 | Doyle | G06F 17/30067 709/203 |
| 2003/0101329 A1 | 5/2003 | Lahti et al. | |
| 2003/0101445 A1* | 5/2003 | Li | G06F 9/44521 717/170 |
| 2003/0110263 A1 | 6/2003 | Shillo | |
| 2003/0149720 A1* | 8/2003 | Goldstein | H04L 29/06 709/202 |
| 2003/0154314 A1* | 8/2003 | Mason, Jr. | H04L 29/12009 709/250 |
| 2003/0191716 A1* | 10/2003 | Woods | G06F 21/6245 705/50 |
| 2003/0236884 A1* | 12/2003 | Yamamoto | G06F 17/30067 709/225 |
| 2004/0006586 A1 | 1/2004 | Melchione et al. | |
| 2004/0015942 A1 | 1/2004 | Branson et al. | |
| 2004/0024649 A1 | 2/2004 | Howard | |
| 2004/0045000 A1* | 3/2004 | Hara | G06F 8/61 717/178 |
| 2004/0059920 A1* | 3/2004 | Godwin | G06F 21/55 713/183 |
| 2004/0073677 A1 | 4/2004 | Honma et al. | |
| 2004/0143477 A1 | 7/2004 | Wolff | |
| 2004/0225952 A1* | 11/2004 | Brown | G06F 8/20 714/819 |
| 2004/0243699 A1* | 12/2004 | Koclanes | H04L 29/06 709/224 |
| 2004/0249691 A1 | 12/2004 | Schell et al. | |
| 2004/0267590 A1 | 12/2004 | Clark et al. | |
| 2005/0033911 A1 | 2/2005 | Kitamura et al. | |
| 2005/0044198 A1* | 2/2005 | Okitsu | G06F 3/0608 709/223 |
| 2005/0055624 A1* | 3/2005 | Seeman | G09B 5/062 715/277 |
| 2005/0060238 A1* | 3/2005 | Gravina | G06Q 30/0601 705/26.1 |
| 2005/0066324 A1 | 3/2005 | Delgado et al. | |
| 2005/0078199 A1 | 4/2005 | Sudo | |
| 2005/0108245 A1 | 5/2005 | Kishimoto et al. | |
| 2005/0149745 A1* | 7/2005 | Ishidoshiro | G06F 21/602 713/189 |
| 2005/0165723 A1* | 7/2005 | Sugimoto | G06F 17/30306 |
| 2005/0179617 A1* | 8/2005 | Matsui | G06T 7/0024 345/7 |
| 2005/0193389 A1* | 9/2005 | Murphy | G06F 8/61 717/175 |
| 2005/0210080 A1 | 9/2005 | Saika | |
| 2005/0234824 A1* | 10/2005 | Gill | H04L 67/34 705/50 |
| 2005/0235282 A1 | 10/2005 | Anderson | |
| 2005/0256942 A1* | 11/2005 | McCardle | G06F 11/3495 709/220 |
| 2005/0283575 A1* | 12/2005 | Kobayashi | G06F 3/0604 711/147 |
| 2006/0053419 A1* | 3/2006 | Barfield | G06F 8/65 717/173 |
| 2006/0064361 A1 | 3/2006 | Matsuura | |
| 2006/0070061 A1* | 3/2006 | Cox | G06F 8/61 717/174 |
| 2006/0075401 A1 | 4/2006 | Smegner | |
| 2006/0092861 A1* | 5/2006 | Corday | H04L 41/0213 370/256 |
| 2006/0107217 A1 | 5/2006 | Lu | |
| 2006/0135190 A1* | 6/2006 | Drouet | H04L 67/34 455/514 |
| 2006/0143070 A1 | 6/2006 | Burnett et al. | |
| 2006/0155672 A1* | 7/2006 | Lee | G06F 8/61 |
| 2006/0168160 A1 | 7/2006 | Pratt | |
| 2006/0206587 A1 | 9/2006 | Fabbrocino | |
| 2006/0214707 A1* | 9/2006 | Ishizaki | G06F 17/2205 327/141 |
| 2006/0242273 A1 | 10/2006 | Fiducci | |
| 2006/0248302 A1 | 11/2006 | Yamamoto et al. | |
| 2007/0106984 A1 | 5/2007 | Birk Olsen et al. | |
| 2007/0136381 A1 | 6/2007 | Cannon et al. | |
| 2007/0156897 A1* | 7/2007 | Lim | G06Q 10/10 709/225 |
| 2007/0157294 A1* | 7/2007 | Johnson | G06F 3/0605 726/4 |
| 2007/0203957 A1 | 8/2007 | Desai et al. | |
| 2007/0208826 A1* | 9/2007 | Devolites | G06Q 30/0601 709/219 |
| 2007/0233782 A1 | 10/2007 | Tali | |
| 2007/0239700 A1 | 10/2007 | Ramachandran | |
| 2007/0240017 A1* | 10/2007 | Takahashi | G06F 11/2015 714/14 |
| 2007/0258108 A1 | 11/2007 | Matsumoto et al. | |
| 2007/0261047 A1 | 11/2007 | Sah et al. | |
| 2007/0271391 A1 | 11/2007 | Fujii | |
| 2007/0294685 A1 | 12/2007 | Oh | |
| 2008/0016311 A1 | 1/2008 | Harada | |
| 2008/0028052 A1 | 1/2008 | Currid et al. | |
| 2008/0034314 A1* | 2/2008 | Louch | G06F 3/0481 715/778 |
| 2008/0046567 A1* | 2/2008 | Watson | H04L 41/0803 709/226 |
| 2008/0046884 A1 | 2/2008 | Shin et al. | |
| 2008/0066148 A1 | 3/2008 | Lim | |
| 2008/0126431 A1 | 5/2008 | Walliser et al. | |
| 2008/0147821 A1 | 6/2008 | Dietrich et al. | |
| 2008/0155214 A1* | 6/2008 | Shitomi | H04L 61/1582 711/162 |
| 2008/0177975 A1* | 7/2008 | Kawamura | G06F 17/30339 711/173 |
| 2008/0183836 A1 | 7/2008 | Barber et al. | |
| 2008/0216066 A1 | 9/2008 | Oh | |

(56) References Cited

U.S. PATENT DOCUMENTS

| | | | |
|---|---|---|---|
| 2008/0226360 A1* | 9/2008 | Sugiyama | G03G 15/0131 399/301 |
| 2008/0263603 A1* | 10/2008 | Murray | G06F 17/30017 725/87 |
| 2008/0270933 A1* | 10/2008 | Straw | G06F 3/0481 715/781 |
| 2009/0037560 A1* | 2/2009 | Hanes | H04L 67/34 709/220 |
| 2009/0063179 A1* | 3/2009 | Huang | G06F 8/61 705/1.1 |
| 2009/0259761 A1* | 10/2009 | Racabi | H04L 65/4084 709/231 |
| 2009/0282398 A1* | 11/2009 | Shen | G06F 8/61 717/174 |
| 2009/0288146 A1* | 11/2009 | Olsson | H04L 63/083 726/4 |
| 2009/0300169 A1 | 12/2009 | Sagar et al. | |
| 2011/0093740 A1* | 4/2011 | Tsao | H04L 67/1097 714/4.12 |

OTHER PUBLICATIONS

Fong, "Dynamic Resource Management in an eUtility", IEEE, Session Sixteen, Service Modeling and Architectures, 2002, pp. 727-740.*

Haeusser, "Implementing IBM Tape in Linux and Windows", Oct. 4, 2007, 344 pages.*
Katz, "Network-Attached Storage Systems", IEEE, 1992, pp. 68-75.*
Kher, "Securing Distributed Storage: Challenges, Techniques, and Systems", StorageSS'05, Nov. 11, 2005, Fairfax, Virginia, USA, pp. 9-25.*
Kom, "Expanded personal computing power and capability", IBM Systems Journal, vol. 24, No. 1, 1985, pp. 26-36.*
Maffeis, "Design and Implementation of a Configurable Mixed-Media File System", ACM SIGOPS Operation Systems Review, vol. 28, issue 4, Oct. 1994, pp. 4-10.*
"SmartStor NS4300N 4-Bay Network Attached Storage", Promise Technology, 2007, two pages.
Gibson, "Network Attached Storage Architecture", Communications of the ACM, Nov. 2000, vol. 43, No. 11, pp. 37-45.
HP ProLiant Storage Server family—Radically Simple Storage, Nov. 2004 (12 pages).
HP Simply Consolidation solution guide, Your guide to shared storage for business efficiency, Simply StorageWorks, 2007 (32 pages).
HP StorageWorks NAS Data Center: A solution for network attached storage (NAS) satellite sites utilizing a central site and HP OpenView Storage Mirroring, Nov. 2004 (18 pages).
Korean Intellectual Property Office, International Search Report of PCT/US2008/069021 dated Jan. 30, 2009 (3 pages).
Wikipedia, Network-attached storage dated on or before Feb. 7, 2008 (5 pages).

\* cited by examiner

PERFORMING ADMINISTRATIVE TASKS ASSOCIATED WITH A NETWORK-ATTACHED STORAGE SYSTEM AT A CLIENT

CROSS REFERENCE TO RELATED APPLICATIONS

This is a continuation of U.S. application Ser. No. 13/002,603, filed Jan. 4, 2011, which is a national stage application under 35 U.S.C. §371 of PCT/US2008/069021, filed Jul. 2, 2008, which are both hereby incorporated by reference in their entirety.

BACKGROUND

A network-attached storage (NAS) system is a system that can be attached to a network and that is specifically designed for data storage. Software residing on the NAS system usually provides functionality that is specific to data storage. Typically, the software on the NAS system does not include higher-level software such as database system management software, or other application software not specific to data storage.

Since a NAS system is typically dedicated to providing data storage, data storage performance can be enhanced since the NAS system does not have to be responsible for performing other types of processing. A NAS system is connected to a network to allow for host systems to access the NAS system. Moreover, a NAS system provides file-level data storage, rather than block-based data storage.

An enterprise (e.g., company, educational facility, government entity) can often have a large number of client devices (e.g., computers) that have to be configured to access NAS systems. Traditionally, a client install compact disk (CD) is provided to each client device to load NAS-related software onto the client device. Also, to properly install the NAS-related software, a network administrator typically has to perform the software installation. In a large enterprise that can have users located at many different geographic locations, installing NAS-related software at the client devices and setting up the client devices for NAS access can be time consuming and inefficient. Moreover, when installing NAS-related software, typically all software components on the client install CD are loaded onto the client device. Some of the software components loaded may never be used by a particular user, and therefore, installing such software components would be wasteful of resources at the client device.

BRIEF DESCRIPTION OF THE DRAWINGS

Some embodiments of the invention are described, by way of example, with respect to the following figures.

DETAILED DESCRIPTION

In accordance with some embodiments, a technique or mechanism is provided to enable efficient performance, at a client device, of administrative tasks associated with a network-attached storage (NAS) system. A NAS system refers to a file-level based storage system that has software (including an operating system and other software) that provides functionality related to data storage and data access, as well as functionality related to management of such data storage/access. The NAS system is connected to a network, such as a local area network (LAN), wide area network (WAN), or other type of network to enable client devices to access the NAS system. The operating system provided on a NAS system is typically a reduced functionality operating system (such as an embedded operating system) that enables file transfer (storage of files or access of files). Various operating systems have been specifically designed for use on NAS systems; each such operating system is referred to as a NAS OS.

To enhance performance of selected administrative tasks associated with a NAS system at a client device, the NAS system is provided with installer code that can be downloaded by a client device through a web browser. The NAS system has a web interface that allows for convenient access by a web browser of the client device. The installer code, once downloaded and executed at the client device, then is able to present a user interface, such as a graphical user interface (GUI), with various menu items and fields to allow a user to select administrative tasks associated with the NAS system to perform. In one example, a series of questions can be provided in the GUI that the user can answer. Based on the answers provided by the user and/or based on other selections made by the user at the client device, the installer code at the client device will then perform selected administrative tasks.

The selected administrative tasks include setting up a user account at the NAS system, downloading selected software components (such as less than all of the software components associated with the NAS system) at the client, setting up shared folders at the NAS system, synchronizing user information between the client device and the NAS system, and so forth.

Figure 1A:
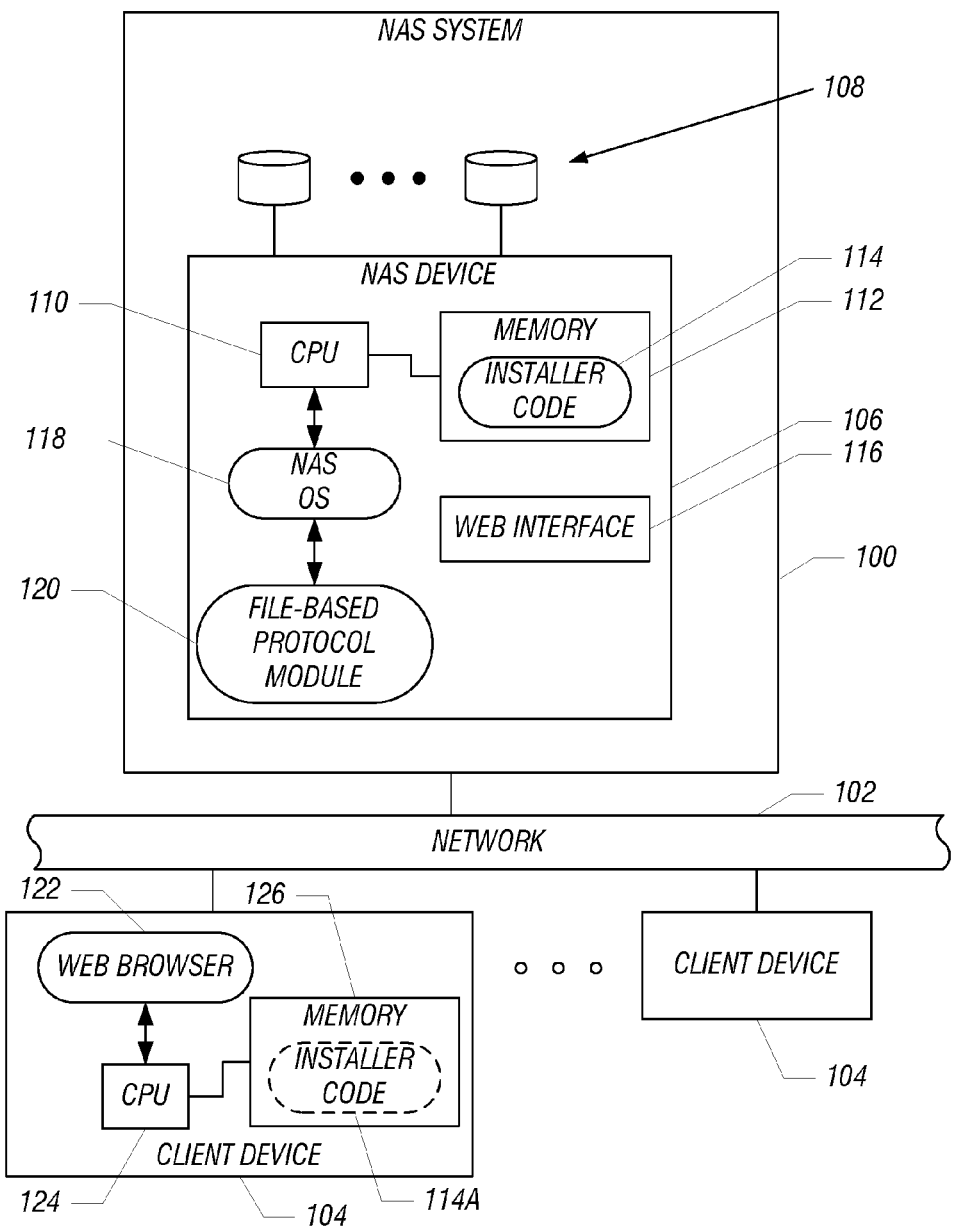
FIG. 1A is a block diagram of an exemplary arrangement including a network-attached storage (NAS) system that is accessible by client devices, in accordance with an embodiment.
Figure 1B:
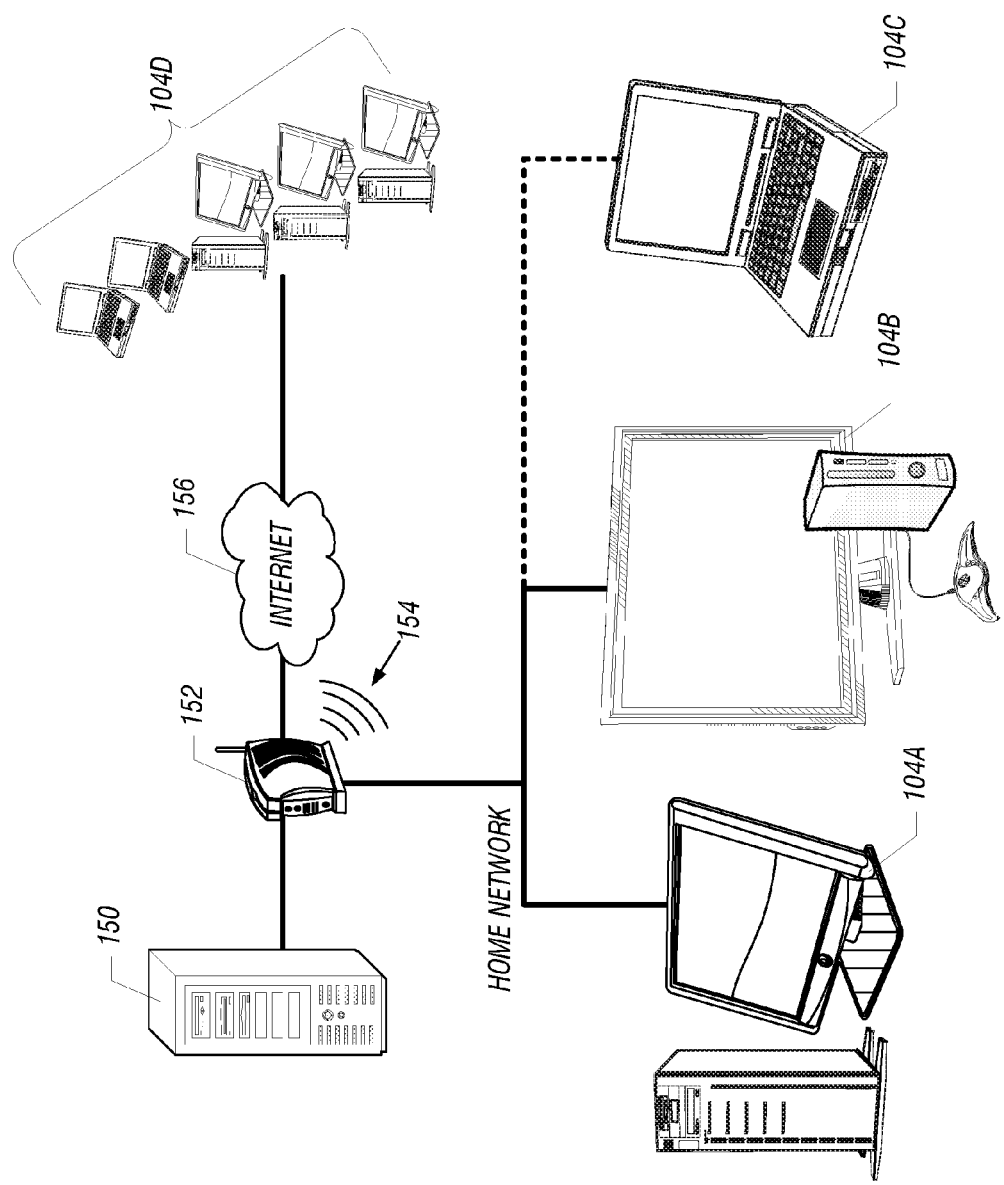
FIG. 1B is a block diagram of another exemplary arrangement in which an embodiment of the invention can be incorporated.

FIG. 1A illustrates an exemplary arrangement that includes a NAS system 100 connected to a network 102 (e.g., LAN, WAN, etc.). Also connected to the network 102 are client devices 104, where the client devices 104 can be computers (desktop or notebook computers), personal digital assistants (PDAs), network appliances, and so forth. Although depicted as a single network, it is noted that network 102 can actually include multiple networks in some implementations. In fact, the network 102 can represent a collection of networks, with client devices connected to such collection of networks possibly located geographically far apart from each other. For example, FIG. 1B shows client devices 104A and 104B connected over a wired home network 158 and through a router 152 to a server 150, which can contain the NAS system 100 of FIG. 1A. A client device 104C is connected by a wireless link 154 to the router 152. Also, client devices 104D are connected over the Internet 156 and through the router 152 to the server 150.

The NAS system 100 of FIG. 1A includes a NAS device 106 (sometimes referred to as a NAS head) that is accessed by a client device 104 for storing or retrieving data contained in one or more storage devices 108 connected to the NAS device 106. The storage devices 108 can be disk-based storage devices or other types of storage devices.

The NAS device 106 contains a central processing unit (CPU) 110 and memory 112. In accordance with some embodiments, the memory 112 stores installer code 114 that can be downloaded to a client device 104 through a web interface 116 in the NAS device 106. For example, a user at the client device can simply type in a uniform resource locator (URL) at the client device to allow a web page containing a link to the installer code 114 to be presented at the client device 104. The memory 112 can be the local temporary or volatile memory of the NAS device 106. Alternatively, instead of the installer code 114 being stored in the memory 112, the installer code 114 can be stored in one of the storage devices 108.

The NAS device 106 also includes a NAS OS 118, which as explained above, is a reduced functionality operating system with less features than a full-feature operating system such as a network operating system (NOS). Also, the NAS device 106 includes a file-based protocol module 120 to provide file-level access of data contained in the storage devices 108. File-level access of data refers to the storage or retrieval of data one file at a time; this is contrasted with block-level access of data in which data is stored or retrieved a block at a time, where a block can be smaller than or larger than a file. Examples of the file-based protocol module 120 include an NFS (network file system) module, CIFS (common Internet file system) module, SMB (server message block) module, or others.

As further depicted in FIG. 1A, a client device 104 includes a web browser 122 that is executable on a CPU 124 of the client device 104. The CPU 124 is connected to a memory 126 of the client device 104, where the memory 126 can be used to store installer code 114A downloaded from the NAS device 106. The other client devices 104 can include similar components.

By using the web browser 122, a convenient mechanism is provided to a user to request the installer code 114 of the NAS system 100 to allow such installer code 114 to be downloaded from the NAS system 100 to the client device 104. The installer code 114 can be an ActiveX component, where ActiveX is a technology developed by Microsoft Corporation. ActiveX controls (which are software modules) can be downloaded from a server computer and executed on a client computer outside of a web browser. Alternatively, instead of being an ActiveX component, the installer code 114 can be a Java applet, or some other type of code that can be downloaded from a server to client for execution on the client.

Figure 2:
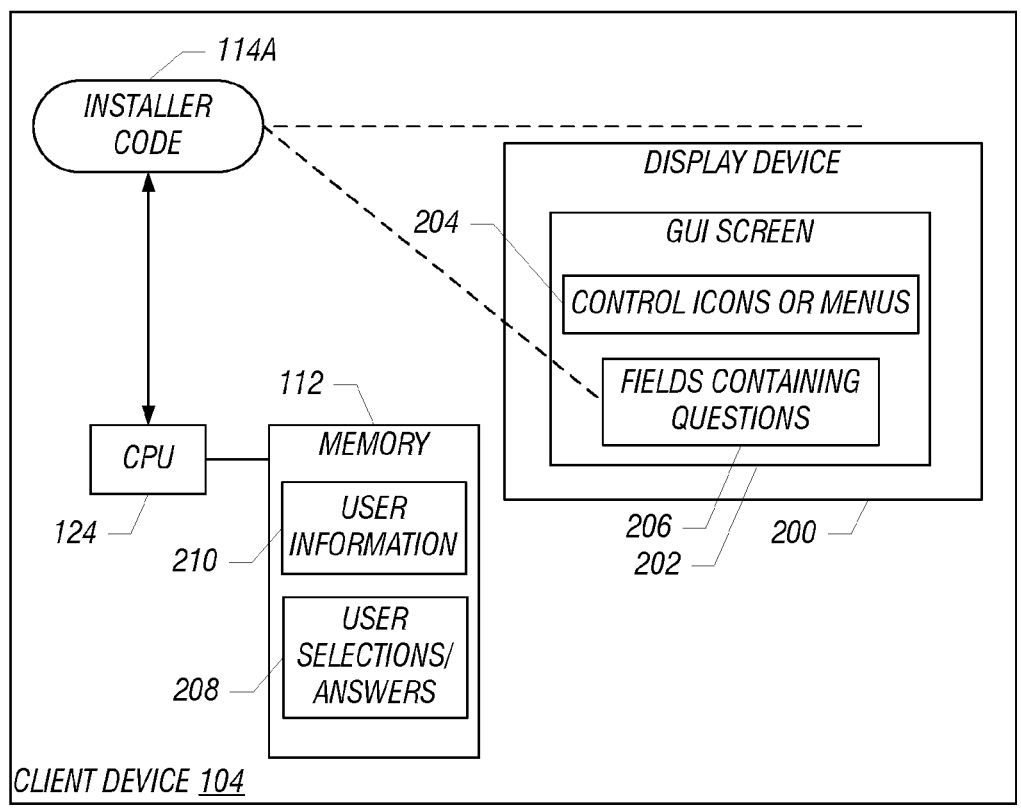
FIG. 2 is a block diagram of components in a client device, according to an embodiment.

FIG. 2 shows execution of the installer code 114A on the CPU 124 of the client device 104. When executed, the installer code 114A presents a GUI screen 202 in a display device 200 of the client device 104. The GUI screen 202 can actually be presented in the web browser 122 user interface (not shown in FIG. 2). The GUI screen 202 can include control icons and/or menus 204, and fields 206 containing questions that can be answered by a user. The control icons and/or menus 204 allow a user to select one or more administrative tasks to perform with respect to the NAS system 100. The fields containing questions 206 presented in the GUI screen 202 can be in response to activation of one or more of the control icons and/or menus 204. Selections made at the control icons and/or menus 204, as well as answers responsive to the fields containing questions 206, can be stored as user selections/answers 208 in the memory 112 of the client device 104.

Also, other user information 210 can be stored in the memory 112, where such other user information can include user account information (e.g., account name and password) that was entered by the user when logging into the client device 104. Other types of user information 210 can include, as examples, user profile information, user preferences, and so forth.

In accordance with some embodiments, synchronization of the user information 210 can be performed between the client device 104 and the NAS system 100. For example, synchronizing the user information 210 allows an account to be set up at the NAS system 100 such that private information associated with the particular user can be protected at the NAS system 100. Private user information protected by user account information can be accessed only by a client device at which the corresponding user has logged in. By synchronizing such user information 210, the user would not have to re-enter account information to set up the user account at the NAS system 100, which enhances convenience to the user.

Also, based on the user selections/answers 208 at the client device 104, the installer code 114A can perform selected administrative tasks relating to the user selections/answers 208. Note that the selected administrative tasks performed can include a subset (less than all) of all possible administrative tasks associated with the NAS system 100.

Examples of the administrative tasks include setting up a user account at the NAS system, installing a subset of software components on the client (such as installing a backup software component to perform backup from the client device 104 to the NAS system 100, a control software component to manage the NAS system 100, and other software components); setting up shared folders at the NAS system 100 to allow multiple users to access data contained in the shared folders; changing or setting up a security setting for the client device 104 at the NAS system; setting up one or more firewall ports at the NAS system 100; and so forth. Changing the security setting can involve reducing the security setting of one or more files such that more users can access such file(s) at the NAS system 100, or increasing the security setting of one or more files. Setting up a firewall port refers to establishing firewall protection for a particular port of the NAS system 100 to prevent unauthorized access of that port.

Figure 3:
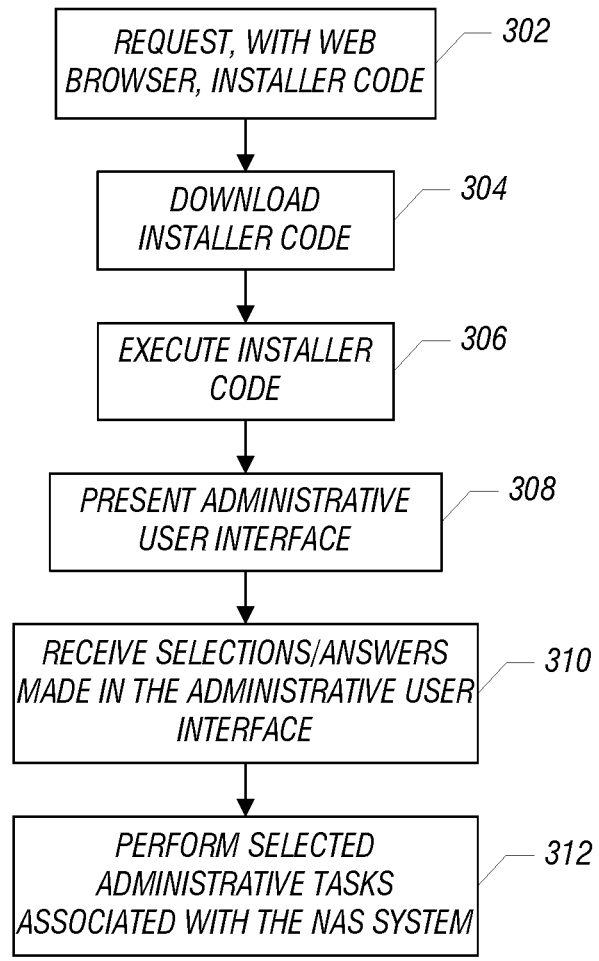
FIG. 3 is a flow diagram of a process of performing administrative tasks associated with the NAS system at a client device, according to an embodiment.

FIG. 3 is a flow diagram that depicts various tasks performed at a client device 104 according to an embodiment. The client device 104 can request (at 302), with the web browser 122 (FIG. 1A), the installer code 114 contained in the NAS system 100. For example, the user can enter the URL of the website associated with the web interface 116 (FIG. 1A) of the NAS system 100, and a web page containing a link to the installer code 114 can be displayed. The user at the client device can click on the displayed link to cause download of the installer code 114 to the client device 104.

In response to the user request, the installer code 114 is downloaded (at 304) to the client device 104. The installer code is then executed (at 306) at the client device 104. The executed installer code presents an administrative user interface (such as the GUI screen 202 of FIG. 2). Selections made by the user in the administrative user interface, as well as answers provided to questions posed by the administrative user interface, are received (at 310) in the client device 104. Based on the received selections/answers, the installer code is able to perform selected administrative tasks associated with the NAS system 100.

In an alternative embodiment, it is possible that when the user makes the request to the NAS system 100 for the installer code 114, information about the user as well as information regarding the client device 104 is provided to the NAS system 100. Based on such information, the NAS system 100 can generate a recommendation, which can be downloaded with the installer code and displayed to the user in the administrative user interface, of what tasks should be performed by the user. This recommendation from the NAS system 100 can be used as a guide on selections to be made in response to answers provided by the installer code.

If later the user desires to change the selections that were previously made, the user can activate a "change" control element (which can be one of the control icons or menus 204 presented in the GUI screen 202 of FIG. 2) to cause management software to be executed. The management software can display the selections previously made by the user, and can provide fields to enable the user to make changes to any of such selections.

In some embodiments, updates of the installer code are also possible. In one example, whenever the NAS system 100 determines that an installer code similarly sent to a client device has changed, the NAS system 100 can send a notification that updated installer code is available. For example, the NAS system 100 can send an e-mail to the user. The user can then request download of the updated version of the installer code. Alternatively, an automated update feature can be provided, where the client device is able to automatically detect or be notified of updates to the installer code (similar to update notifications provided with operating systems such as WINDOWS® operating systems from Microsoft.

Instructions of software described above (including the installer code 114/114A, web browser 122, NAS OS 118, file-based protocol module 120, etc. of FIG. 1A) are loaded for execution on a processor (such as one or more CPUs 110 or 124 in FIG. 1A). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    receiving, from a network-attached storage (NAS) system, installer code at a client device;
    executing the installer code at the client device, wherein executing the installer code causes display of a user interface at the client device;
    presenting, by the installer code, questions in the user interface at the client device;
    responsive to answers to the questions received in the user interface, installing, by the installer code executing at the client device, a subset of software components relating to the NAS system on the client device;
    selecting, by the installer code executing at the client device, a selected subset of administrative tasks based on the answers; and
    executing, by the installer code executing at the client device, the selected subset of administrative tasks, the selected subset of administrative tasks comprising operations that change settings at the NAS system, wherein executing the selected subset of administrative tasks comprises setting up a user account at the NAS system.

2. The method of claim 1, wherein receiving the installer code at the client device comprises a web browser at the client device receiving the installer code from a web interface at the NAS system.

3. The method of claim 1, wherein installing the subset of the software components comprises installing a control software component to manage the NAS system.

4. The method of claim 1, wherein executing the selected subset of administrative tasks further comprises at least one selected from among: (1) setting up a firewall port at the NAS system, (2) changing a security setting at the NAS system, or (3) setting up shared folders at the NAS system.

5. The method of claim 1, wherein receiving the installer code comprises receiving one of an ActiveX code and a Java applet.

6. The method of claim 1, wherein receiving the installer code comprises receiving the installer code over a network from the NAS system.

7. A client device comprising:
    at least one processor; and
    a non-transitory storage medium storing instructions executable on the at least one processor to receive, over a network from a network-attached storage (NAS) system, installer code;
    the received installer code executable on the at least one processor to:
        cause display of a user interface at the client device;
        present questions in the user interface at the client device; and
        responsive to answers to the questions received in the user interface,
            select a subset of software components less than all software components relating to the NAS system on the client device stored on a storage medium,
            install the selected subset of software components relating to the NAS system on the client device,
            select a subset of administrative tasks responsive to the answers to the questions received in the user interface, and
            execute the selected subset of administrative tasks that comprise operations that change settings at the NAS system, the selected subset of administrative tasks comprising setting up a user account at the NAS system.

8. The client device of claim 7, further comprising a web browser to download the installer code to the client device from a web interface of the NAS system.

9. The client device of claim 7, wherein the selected subset of administrative tasks further comprises setting up a firewall port at the NAS system.

10. The client device of claim 7, wherein the selected subset of administrative tasks further comprises changing a security setting at the NAS system.

11. The client device of claim 7, wherein the selected subset of administrative tasks further comprises setting up shared folders at the NAS system.

12. The client device of claim 7, wherein the subset of software components comprises a control software component to manage the NAS system.

13. A non-transitory computer-readable storage medium storing instructions that when executed cause a client device to:
- receive, over a network from a network-attached storage (NAS) system, installer code;
- execute the installer code at the client device, wherein executing the installer code causes display of a graphical user interface at the client device;
- present, by the installer code, questions in the graphical user interface at the client device;
- responsive to answers to the questions received in the graphical user interface, select, by the installer code from among software components stored on a storage medium, a subset of the software components relating to the NAS system;
- install, by the installer code, the selected subset of software components on the client device;
- select a subset of administrative tasks responsive to the answers to the questions received in the graphical user interface; and
- execute the selected subset of administrative tasks that comprise operations that change settings at the NAS system, the selected subset of administrative tasks comprising setting up a user account at the NAS system.

14. The non-transitory computer-readable storage medium of claim 13, wherein the instructions when executed cause the client device to further:
- submit first information relating to a user and the client device to the NAS system; and
- receive second information based on the first information regarding tasks recommended by the NAS system to be performed at the client device.

15. The non-transitory computer-readable storage medium of claim 13, wherein executing the selected subset of administrative tasks further comprises at least one selected from among: setting up a firewall port at the NAS system, changing a security setting at the NAS system, or setting up shared folders at the NAS system.

* * * * *